United States Patent [19]

Katayama et al.

[11] Patent Number: 5,008,950
[45] Date of Patent: Apr. 16, 1991

[54] IMAGE PROCESSING METHOD AND APPARATUS FOR ERROR-DISPERSION DIGITIZATION WITHOUT MOIRE OR SPURIOUS STRIPE FORMATION

[75] Inventors: Akihiro Katayama, Kawasaki; Hidefumi Ohsawa, Urawa, both of Japan

[73] Assignee: Canon Kabushiki Kaisha, Tokyo, Japan

[21] Appl. No.: 145,593

[22] Filed: Jan. 19, 1988

[30] Foreign Application Priority Data

Jan. 22, 1987 [JP] Japan .................................. 62-013688
May 21, 1987 [JP] Japan .................................. 62-122613
May 21, 1987 [JP] Japan .................................. 62-122614

[51] Int. Cl.$^5$ ............................................. G06K 9/40
[52] U.S. Cl. ..................................... 382/50; 358/447; 358/455; 358/463; 382/54
[58] Field of Search ................ 358/282, 283, 284, 135, 358/447, 454, 455, 457, 463; 382/27, 50, 8, 42, 49, 44, 54, 53, 52; 364/574

[56] References Cited

U.S. PATENT DOCUMENTS 4,675,909 6/1987 Egami et al. .......................... 382/50
4,692,811 9/1987 Tsuchiya et al. ...................... 382/54

Primary Examiner—Leo H. Boudreau
Attorney, Agent, or Firm—Fitzpatrick, Cella, Harper & Scinto

[57] ABSTRACT

There is provided an improvement on the error dispersion method for binary digitizing of an image, in which an area of plural pixels is digtzed, and the error into the digitizing is dispersed in a neighboring area of plural pixels. In the latter area the digitization is conducted according to the image data of plural pixels and the error data dispersed into this area.

11 Claims, 11 Drawing Sheets

FIG. 3A

|  |  |  |  |  |
|---|---|---|---|---|
|  |  | $B_{i,j}$ | $B_{i+1,j}$ |  |
|  | $B_{i-1,j+1}$ | $B_{i,j+1}$ | $B_{i+1,j+1}$ |  |
|  |  |  |  |  |
|  |  |  |  |  |

FIG. 3B $B_{i,j}$

| $D_{11}$ | $D_{12}$ | $D_{13}$ | $D_{14}$ |
|---|---|---|---|
| $D_{21}$ | $D_{22}$ | $D_{23}$ | $D_{24}$ |
| $D_{31}$ | $D_{32}$ | $D_{33}$ | $D_{34}$ |
| $D_{41}$ | $D_{42}$ | $D_{43}$ | $D_{44}$ |

FIG. 11
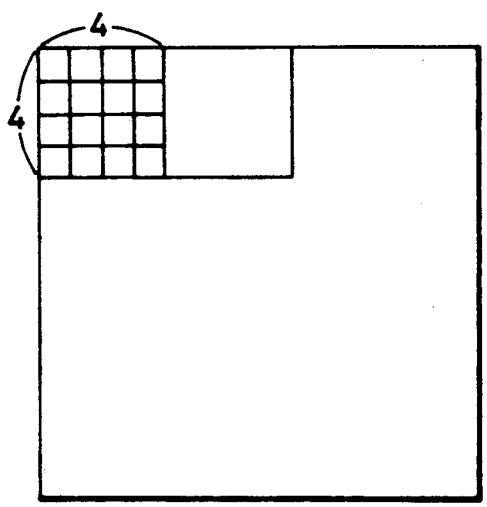
FIG. 12
FIG. 14A
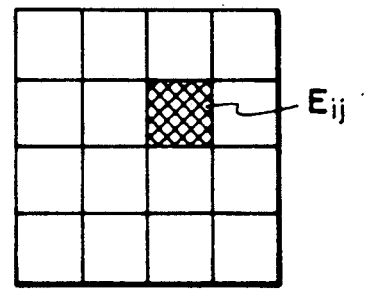
FIG. 14B
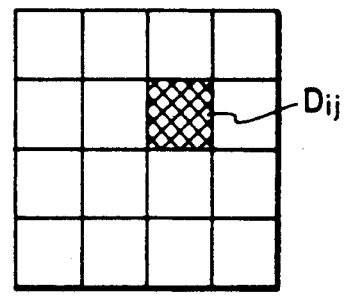

IMAGE PROCESSING METHOD AND APPARATUS FOR ERROR-DISPERSION DIGITIZATION WITHOUT MOIRE OR SPURIOUS STRIPE FORMATION

BACKGROUND OF THE INVENTION

1. Field of the Invention

The present invention relates to an image processing method for processing an image in digital manner and an apparatus therefor, and more particularly to an image processing method for obtaining a high-quality image from image density data and an apparatus therefor.

2. Related Background Art

So-called digital copying machines, in which an image is sampled by a CCD sensor or the like and the obtained digital data are supplied to a digital printer such as a laser beam printer for reproducing the image, are replacing conventional analog copying machines, owing to the progress in the digital devices.

The reproduction of intermediate tone in such digital copying machines is generally achieved by a dither method or a density pattern method. However, such methods have been associated with the following drawbacks:

(1) if the original image is a screen-tone image such as a printed image, the copied image may show stripe patterns which do not exist in the original image; and (2) if the original image contains line-tone images or characters, the image quality may be deteriorated as the edges are broken by the dither method.

The phenomenon (1) is called Moiré and is induced by:

(A) a beat phenomenon between the screen-tone original image and the input sampling; or (B) a beat phenomenon between the screen-tone original image and the dither threshold matrix.

The phenomenon (b) becomes particularly evident when the dither threshold values are arranged in a dot concentrated pattern. In such case the reproduced image has a pseudo-screentone structure, which generates a beat phenomenon with the screentone structure of the input image, thus creating Moiré patterns.

As another binary digitizing method there is already known the error dispersion method, in which the difference or error in density between the original image and the reproduced image is calculated for each pixel, and said error is dispersed in the surrounding pixels with a predetermined weighting. This method was published by R. W. Floyd and L. Steinberg in "An Adaptive Algorithm for Spatial Grey Scale", SID 75 DIGEST p. 36–37 . In comparison with the aforementioned dither method, this method lacks periodicity in the processing and does not, therefore, generate Moiré patterns from a screentone original image. It is, however, associated with the drawbacks of showing particular stripe patterns in the reproduced image or providing granular noise particularly in the highlight and shadow areas of the image.

In order to eliminate these drawbacks, in U.S. Pat. No. 4,876,610, the assignee of the present application has proposed a method of varying the error dispersing area according to the characteristic of the original image, and U.S. Pat. No. 4,878,125 of the assignee of the present invention has proposed a method of varying the ratio of distribution of the error in relation to the amount and direction of edges in the image.

SUMMARY OF THE INVENTION

An object of the present invention is to eliminate the drawbacks in the prior technology and to provide a novel image processing method and an apparatus therefor.

Another object of the present invention is to provide an improvement over an image processing method for digitizing density data of an image and an apparatus therefor.

Still another object of the present invention is to provide an image processing method capable of providing a binary image of high quality from density data of an image, and an apparatus therefor.

According to one aspect of the present invention is provided an image processing method capable of faithfully reproducing an original image, by dispersing error data, generated in the digitizing of an area composed of plural pixels, into an adjacent unprocessed area and executing the digitizing in succession, and an apparatus therefor.

According to another aspect of the present invention is provided an image processing apparatus capable of determining binary states of plural pixels in a predetermined area, by binary digitizing each of image data of plural pixels in said predetermined area and giving sequential preference t said plural pixels corresponding to the image data.

The foregoing and still other objects features and advantages of the present invention will become fully apparent from the following detailed description of the preferred embodiments, taken in conjunction with the attached drawings.

BRIEF DESCRIPTION OF THE DRAWINGS

FIG. 3A is a chart showing destinations of distribution of error in a subject block;

FIG. 3B is a chart showing densities of pixels in a subject block $B_{i,j}$;

FIG. 11 is a schematic view showing a block to be processed;

FIG. 12 is a view showing pixel densities in said block;

FIGS. 14A and 14B are charts illustrating the function of a threshold value setting circuit of the embodiment shown in FIG. 13.

DETAILED DESCRIPTION OF THE PREFERRED EMBODIMENTS

Now the present invention will be clarified in detail by description of the preferred embodiments thereof, shown in the attached drawings.

Figure 1:
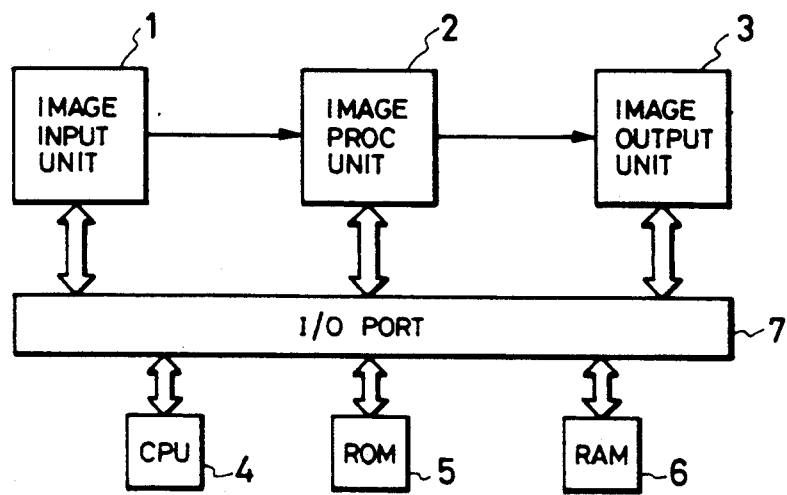
FIG. 1 is a block diagram of an embodiment of the image processing apparatus of the present invention.

FIG. 1 is a block diagram of an image processing apparatus embodying the present invention.

An image input unit 1 reads an original image with a photoelectric converting device, such as a CCD sensor and a driving system for causing scanning operation of said device, and converts the obtained analog data by an A/D-converter into digital data of, for example, 8 bits per pixel. Then said digital data are subjected to a digital correction process for unevenness in the sensitivity of the CCD sensor and unevenness in the luminosity of an illuminating source, and supplied to an image process unit 2.

The image process unit 2 binarizes the digital data from the image input unit 1, and sends the binary digitized data to an image output unit 3, which executes image formation by on/off control of dots according to the binary data supplied from the image process unit 2.

A central processing unit (CPU) 4 controls the image input unit 1, image process unit 2 and image output unit 3 according to a program stored in a ROM 5. A RAM 6 is used as a work memory. An I/O port 7 functions as an interface for the image input unit 1, image process unit 2, image output unit 3, CPU 4, ROM 5 and RAM 6.

In the following there will be given a more detailed explanation on the image process unit 2, of which details are given in FIG. 2.

Figure 2:
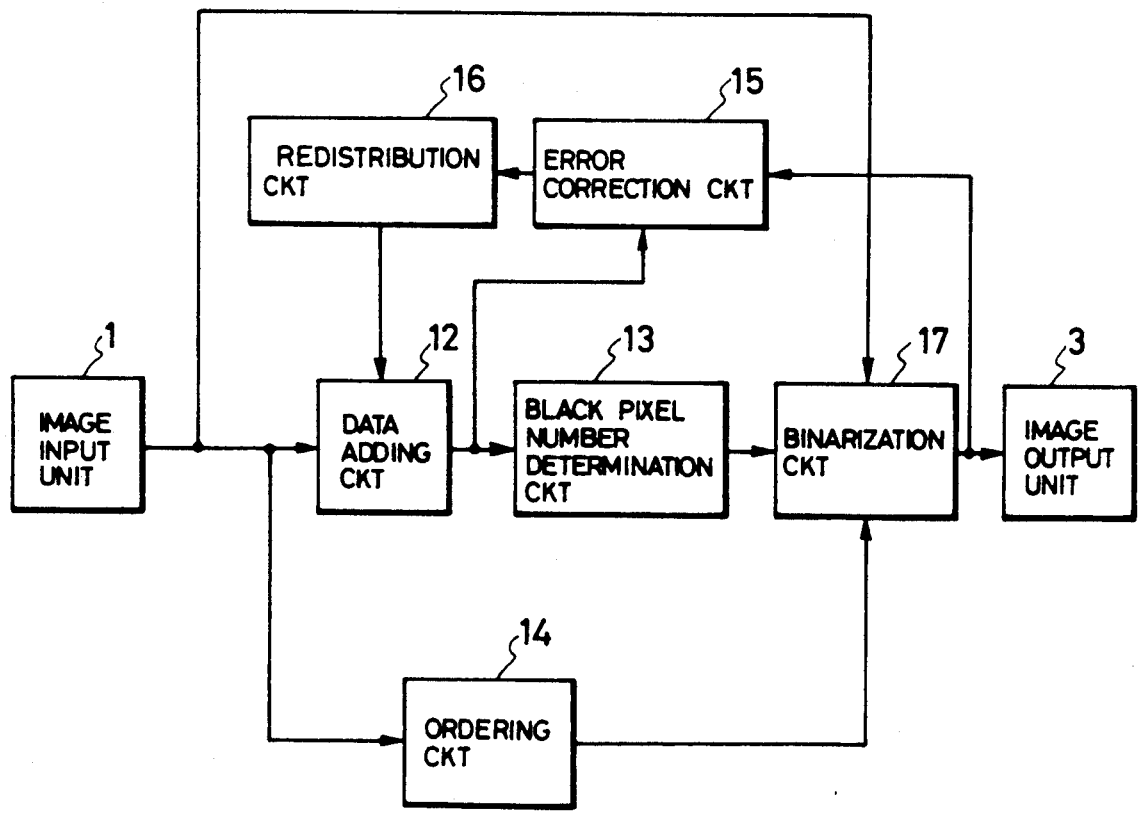
FIG. 2 is a block diagram showing the details of an image process unit 2 in FIG. 1.

As shown in FIG. 2, the apparatus of the present embodiment is provided with the image input unit 1; a data adding circuit 12 for adding image density data from said image input unit 1 and an error redistributed by a redistribution circuit 16; a black pixel number determination circuit 13 for determining the number of black pixels based on the total sum of density data from the data adding circuit 12; an ordering circuit 14 for rearranging the image data from the image input unit 1 in the descending order of densities; an error correction circuit 15 for determining the error based on the total sum of density data from the data adding circuit 12 and the number of black pixels from a binarizing circuit 17; redistribution circuit 16 for redistributing the pixels corrected by said error correction circuit 15; the binarizing circuit 17; and the image output unit 3.

The binarizing circuit 17 binarizes the input data by designating black pixels in the descending order of densities corresponding to the determined number of black pixels, and designating the remainder as white pixels.

FIGS. 3A and 3B illustrate the function of the redistribution circuit 16 in the above-explained embodiment.

In FIG. 3A, B indicates a block, and $B_{i,j}$ indicates a subject block currently under processing.

FIG. 3B shows the pixels of said subject block $B_{i,j}$. A block B is generally composed of n x n pixels, in the present embodiment 4×4 pixels.

Figure 4:
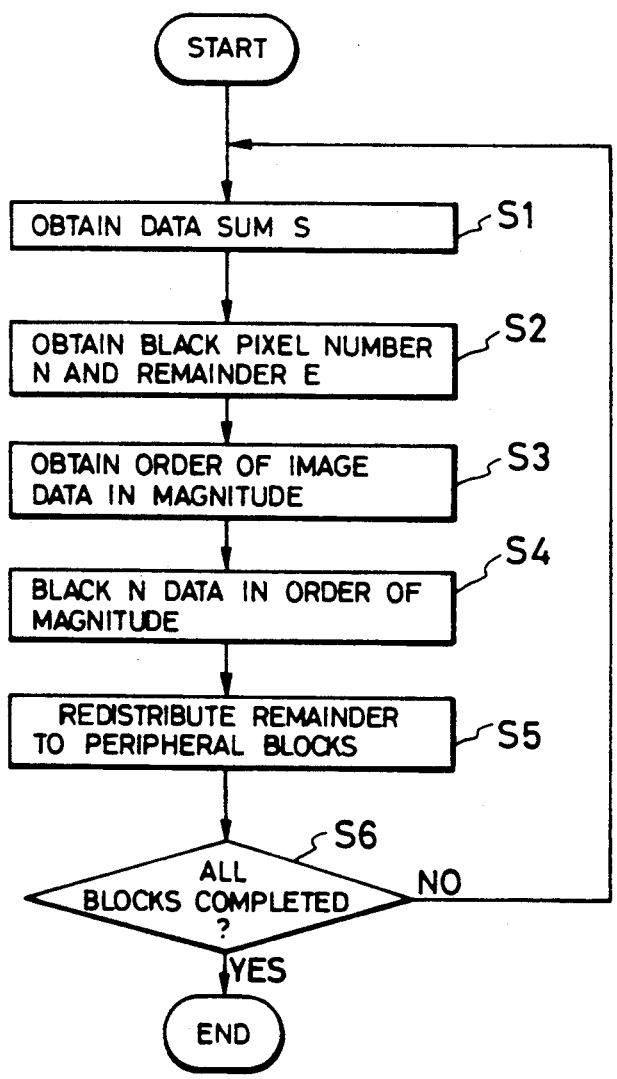
FIG. 4 is a flow chart showing the function of the foregoing first embodiment.

In the following there will be explained the function of the above-described embodiment. FIG. 4 is a flow chart showing the function of said embodiment. Said flow chart is executed by the CPU 4 according to a control program stored in the ROM 5.

At first the data adding circuit 12 determines the total sum S of the density of image data existing in a block $B_{i,j}$ as shown in FIG. 3B (step S1). Said sum S contains the error generated in the already processed blocks and distributed with certain weighting. In the embodiment shown in FIGS. 3A and 3B where n=4, said sum S is represented by:

$$S = \sum_{i=1}^{4} \sum_{j=1}^{4} D_{ij}$$

Then the black pixel number determination circuit 13 determines the number N of black pixels and the remainder E (step S2) according to the following formulas:

$$N = [S/Q] \quad (1)$$

$$E = S - N \times Q \quad (2)$$

wherein [] is the Gaussian symbol representing the integral part of the number therein, while Q is a predetermined signal level, which is generally the density level of a dot formed by the printer.

Then the ordering circuit 14 determines the sequential order of the magnitude of density data of the image shown in FIG. 3B. Pixels of the same density are arranged according to a predetermined sequential order. Then, based on the black pixel number N determined in the step S2 and the sequential order determined in the step S3, the binarizing circuit 17 converts N pixels with densities of descending order (i.e., the N densest pixels) into black pixels, and determines the remaining positions as white pixels (step S4). Consequently, the total density in the block after processing becomes equal to Q x N.

Then the error correction circuit 15 and the redistribution circuit 16 redistributes the remainder E, determined in the equation (2), as the error generated in the subject block, into the peripheral blocks $B_{i+1,j}$, $B_{i-1,j+1}$, $B_{i,j+1}$ and $B_{i+1,j+1}$ around the subject block $B_{i,j}$ with suitable weighting (step S5).

A step S6 then discriminates whether the processing of image data of all the blocks supplied from the image input unit 1 has been completed, and the sequence of steps 1 to 5 are repeated until all the blocks have been processed.

As explained in the foregoing, the present embodiment determines the number of black pixels from the total sum of density in a block and places the thus determined black pixels at the pixel positions of higher densities in said block, thereby enabling faithful reproduction of the original image and edge enhancement.

Also, the density constituting the remainder in a block is dispersed into the peripheral blocks, so that the density of the output image can be matched with that of the original image.

In comparison with the conventional error dispersion method in which the error generated in the binarization of each pixel is dispersed to the surrounding pixels, the present embodiment employs a processing in units of a block, so that formation of stripe patterns encountered in said error dispersion method can be prevented.

Figure 5:
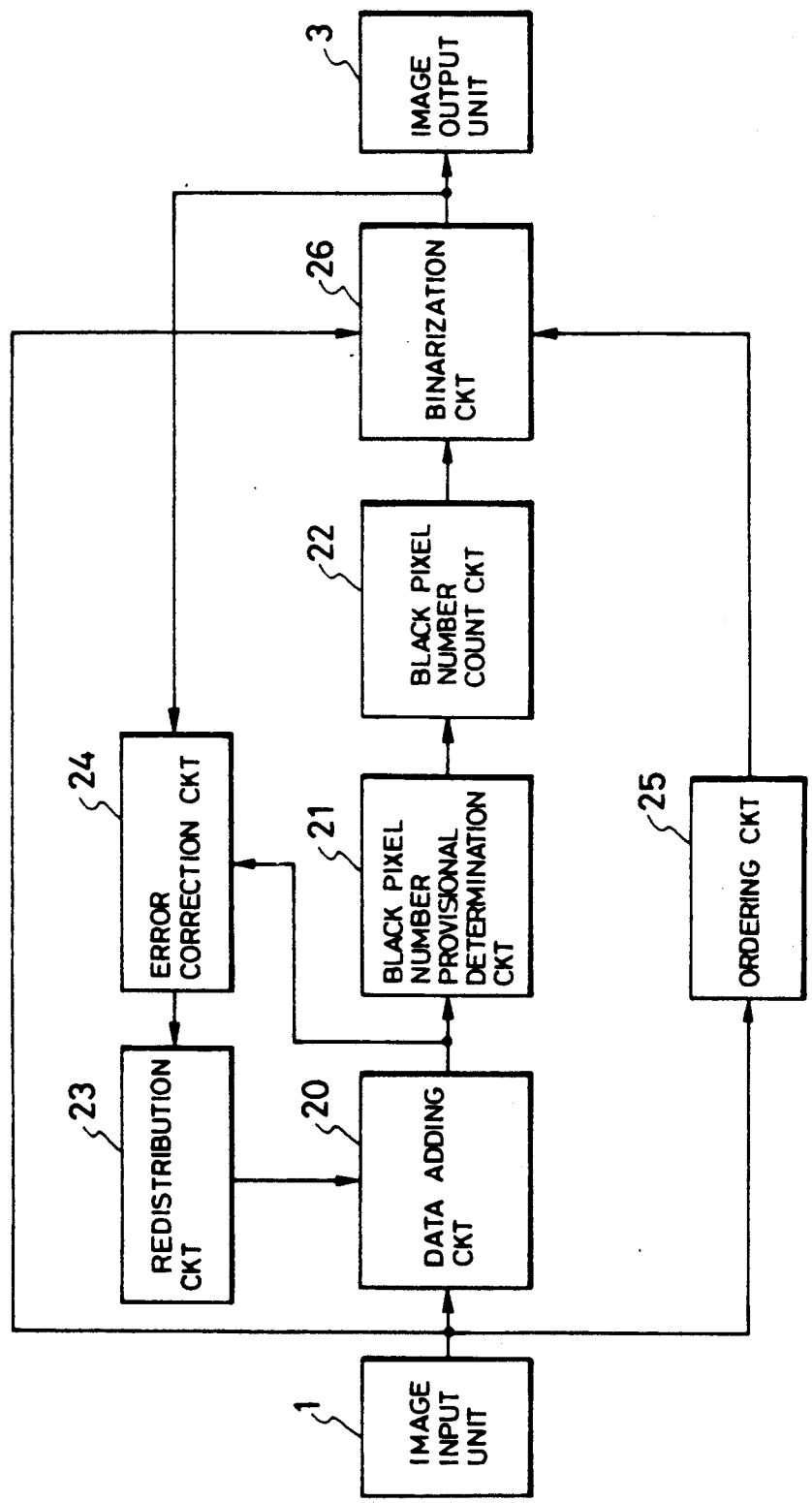
FIG. 5 is a block diagram of a second embodiment of the present invention.

In the following there will be explained a second embodiment of the present invention in which the image process unit 2 is modified. FIG. 5 is a block diagram of said second embodiment.

The apparatus of said second embodiment is provided with an image input unit 1; a data adding circuit 20 for adding the input data from said image input unit 1 and the error redistributed by a redistribution circuit 23; a black pixel number provisional determination circuit 21 connected to said data adding circuit 20 and used for provisionally determining the number of black pixels in the block; a black pixel number determination circuit 22 for finally determining the number of black pixels in the block; a redistribution circuit 23 for redistributing the corrected error; an error correction circuit 24 for correcting the error between the data from the data adding circuit 10 and the binary data from a binarizing circuit 16; an ordering circuit 25 for arranging the input data from the image input unit 1 in the descending order; a binarizing circuit 26 for determining black and white pixels based on the input data; and an image output unit 3 for releasing the binary data.

In the following there will be explained the function of the embodiment shown in FIG. 5.

Figure 6:
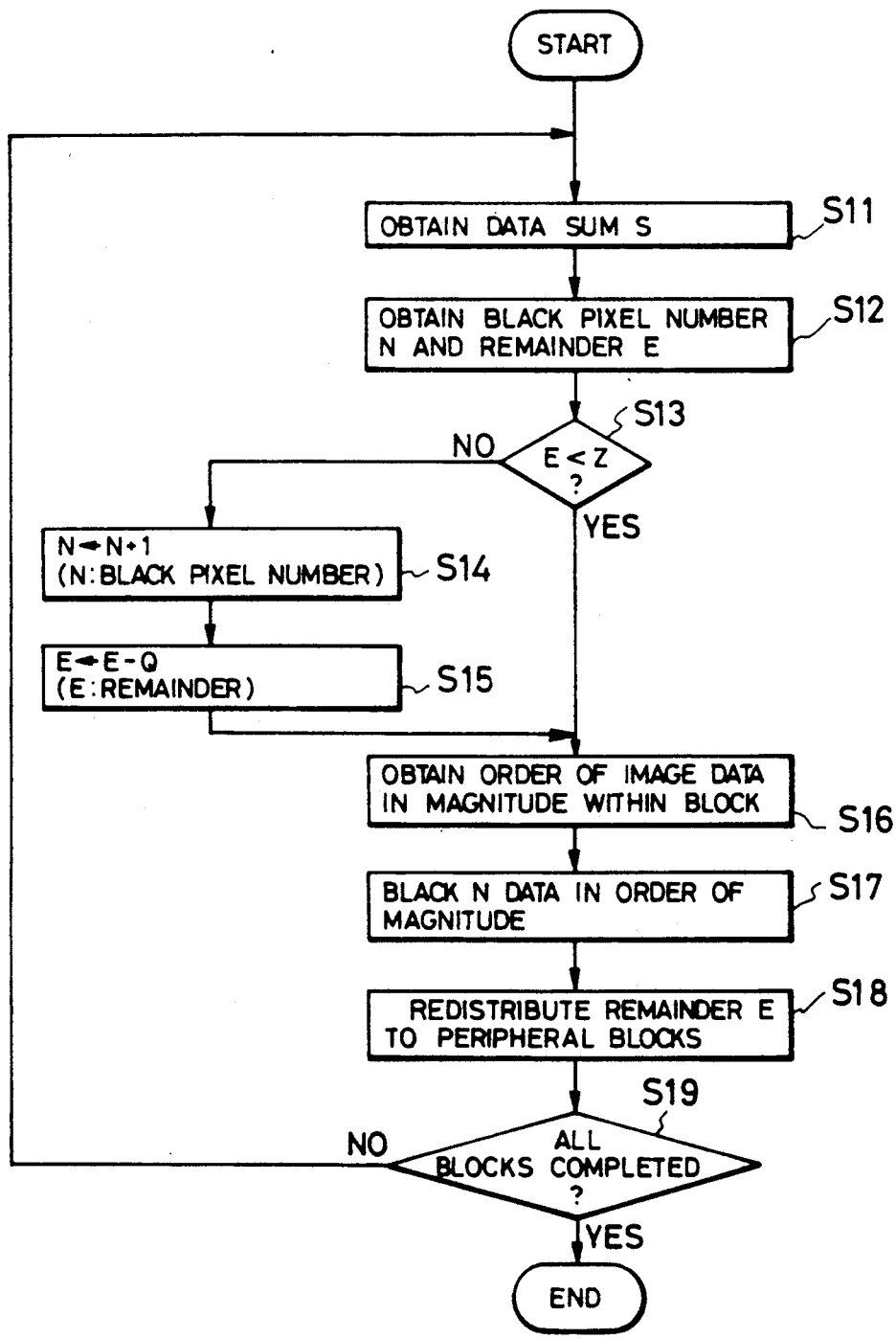
FIG. 6 is a flow chart showing the function of the embodiment shown in FIG. 5.

FIG. 6 is a flow chart showing the function of said embodiment, said flow chart being executed by the CPU 4 according to a control program stored in the ROM 5.

At first the data adding circuit 12 determines the total sum S of the density of the image data in a block as shown in FIG. 3B (step S11).

Said total sum S contains the error generated in already processed blocks and distributed with certain weightings.

In case of the block shown in FIG. 3B, in which n=4, said sum S can be represented by:

$$S = \sum_{i=1}^{4} \sum_{j=1}^{4} D_{ij}$$

Then the black pixel number provisional determination circuit 21 determines the number N of black pixels and the remainder E (step S12) according to the following formulas:

$$N=[S/Q_j] \quad (3)$$

$$E=S-Q\times N \quad (4)$$

wherein [] is the Gaussian symbol indicating an integral part of the number therein, and Q is a predetermined image signal level, which is usually equal to the number of density levels in the original image but is not limited thereto.

Then the black pixel number determination circuit 22 compares the remainder E, determined in the equation (4), with a threshold value Z (step S13), and, if the remainder E is equal to or larger than the threshold value Z, the black pixel number N is increased by one (step S14), and the remainder E is replaced by an error of (E−Q) (step S15).

In the foregoing operation, the threshold value Z may be fixed, or may be made variable for example in such a manner that said threshold value Z is selected smaller or larger respectively when the average density in the block is low or high.

Then the ordering circuit 25 checks the sequential order to magnitude of density of the image data in the block (step S16).

Subsequently the binarizing circuit 26 designates black pixels of a number N, at the pixel positions of high densities in the descending order in the block (step S17). Pixels of the same density are designated as black pixels in a predetermined sequential order.

The negative error E generated in the binarization (E-Q determined in the step S15) is redistributed with suitable weighting amount peripheral blocks (step S18). As an example, said error may be distributed to the blocks adjacent in the main scanning or sub-scanning direction and to those adjacent in the diagonal direction with a ratio 2:1, but other distribution methods may also be adopted.

After the binarization in a block is completed, the binarization in the next block is conducted according to the above-explained sequence, taking the total of the density data in said next block and of the redistributed error as the aforementioned sum S. The binarization of the entire body of data can be achieved by repeating said sequence, until a step S19 discriminates the completion of processing on all the blocks.

The above-explained second embodiment does not simply disperse the error in the peripheral blocks, but increases the number of block pixels if the error exceeds a predetermined density level and redistributes a negative error among the peripheral blocks, thereby achieving a more faithful reproduction of the original image in each block, in comparison with the foregoing first embodiment. The original input image can therefore be satisfactorily reproduced.

In the following there will be explained a third embodiment of the present invention, in which the image process unit 2 is modified.

Figure 7:
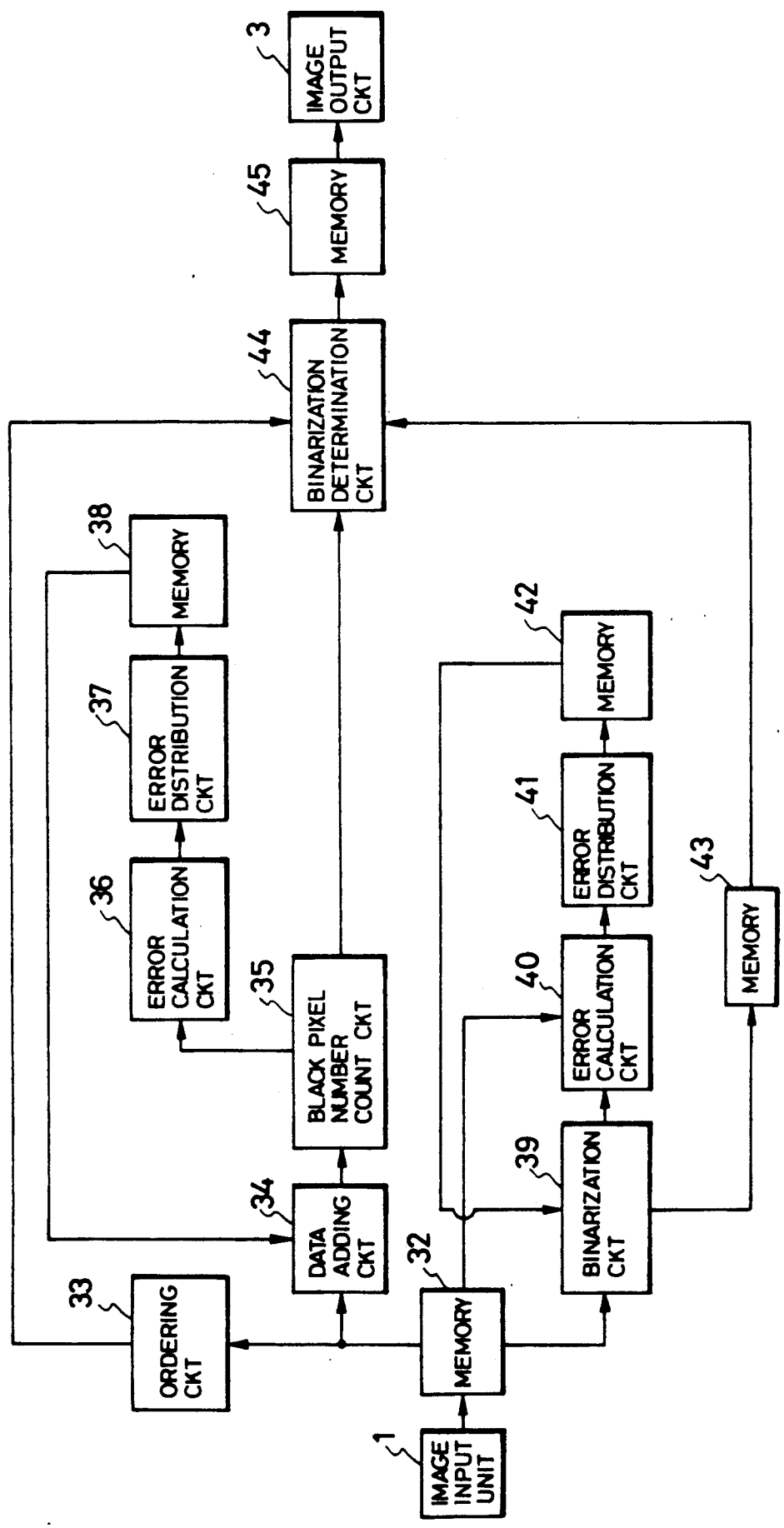
FIG. 7 is a block diagram of a third embodiment of the present invention.

FIG. 7 is a block diagram of said third embodiment of the present invention, provided with an image input unit 1; a memory 32 connected to the image input unit 1 and used for storing data in a block; an ordering circuit 33 connected to said memory 32 and used for arranging the data in the block in a sequential order; a data adding circuit 34 connected to memories 32, 28 for calculating the total sum of the data in the block; a black pixel number counting circuit 35 connected to the data adding circuit 34 and used for counting the number of black pixels in the block; an error calculation circuit 36 connected to the black pixel counting circuit 35 and used for calculating the error; an error distribution circuit 37 connected to the error calculation circuit 36 and used for distributing the error among the peripheral blocks; a memory connected to said error distribution circuit 37 and used for storing the destinations and amounts of said error distribution; a binarizing circuit 39 connected to memories 32, 42 and used for binarization with a certain threshold value; an error calculation circuit connected to the memory 32 and the binarization circuit 39 and used for calculating the difference between the input data and the binary data; an error distribution circuit 41 connected to the error calculation circuit 40 and used for determining the destinations and amounts of error distribution; a memory 42 connected to the error distribution circuit 41 and used for storing the destinations and amount of error distribution; a memory 43 connected to the binarization circuit 39 and used for storing binarized data; a binarization determination circuit 44 connected to the ordering circuit 33, the black pixel counting circuit 35 and the memory 43 and used for determining the binary data; a memory 45 connected to the binarization determination circuit 44 and used for storing final binary data; and an image output unit 3 connected to the memory 45 and used for releasing binary data.

Figure 8:
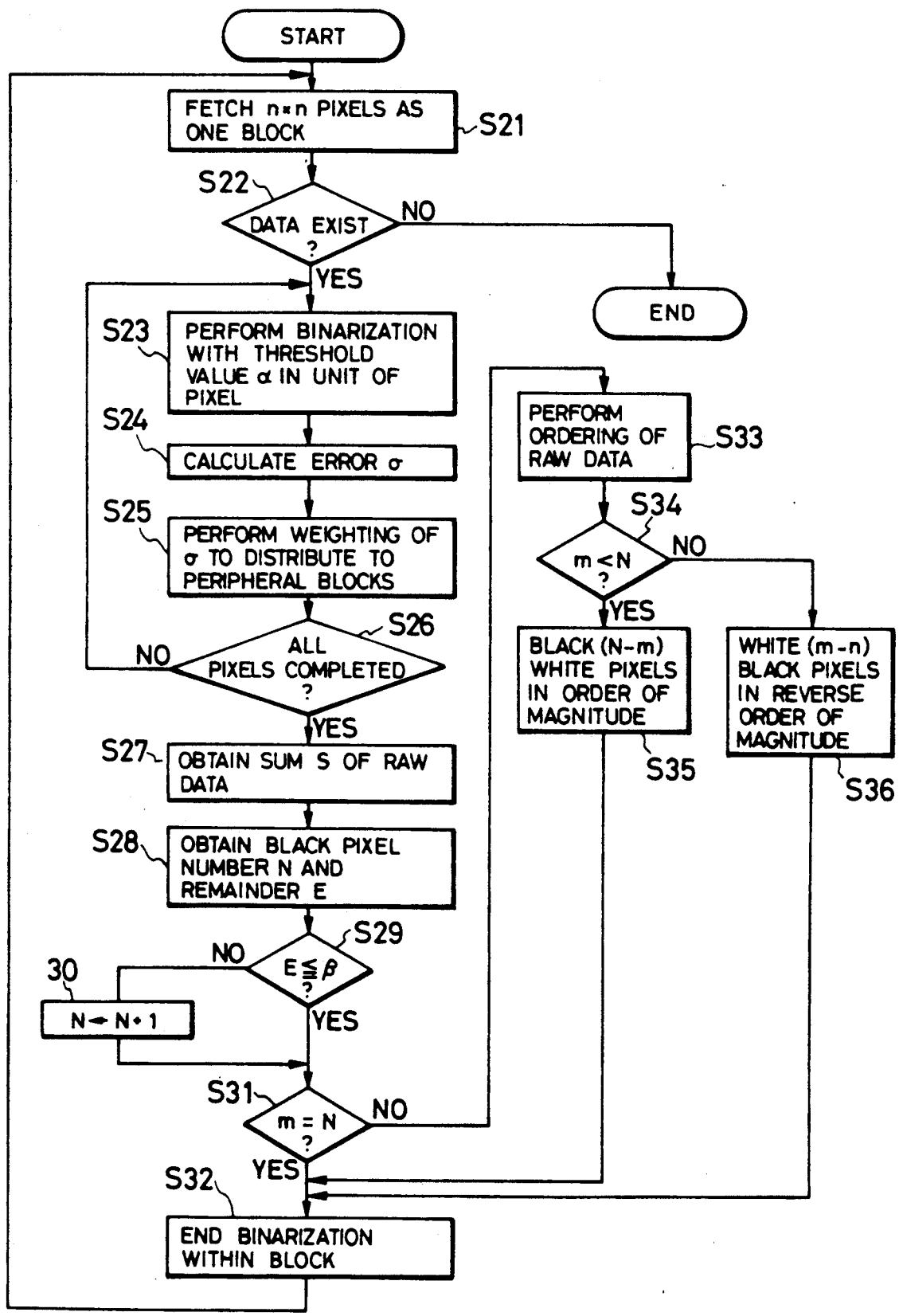
FIG. 8 is a flow chart showing the function of the embodiment shown in FIG. 7.

Now reference is made to a flow chart shown in FIG. 8 for explaining the function of the components of the apparatus of FIG. 7. The data entered by the image input unit 1 are fetched, in a step S21, into the memory 32 in units of blocks of n×n pixels. If a step S22 discriminates the presence of data, the data are fetched in the binarization circuit 39 for each block, and a step S23 executes binarization with a threshold value c for each pixel in the block. The results of binarization are stored in the memory 43, then a step S24 calculates the error $\sigma$ between the original data and the binarized data in the error calculation circuit 40, and, in a step S25, the error distribution circuit 41 determines the destinations and amounts of distribution of the error $\sigma$, with suitable weighting, said destinations and amounts being stored in the memory 42. The amount of distribution stored in the memory 42 is supplied to the binarization circuit 39, which adds said amount to the next density and executes binarization with the threshold value $\alpha$. The foregoing steps S23 to S26 are repeated until all the pixels in the block are processed.

Upon completion of processing of a block, the sequence proceeds from the step S26 to a step S27 to fetch the original data of a block from the memory 32 into the data adding circuit 34 and to calculate the total sum S of said original data in the block. In a step S28, the black pixel counting circuit 35 counts the number of black pixels from said sum S, and the error calculating circuit 36 calculates the remainder E. Then the error distribution circuit 37 determines the destinations and amounts of error distribution, and these destinations and amounts are stored in the memory 38. The data stored in said memory 38 are used for calculating the total sum of the data in the next block. If said remainder E is larger than a threshold value $\beta$, steps S29 and S30 increases the value of N by one.

Then, a step S31 compares the black pixel number m of the binary data in the memory 43 with the black pixel number N from the black pixel number counting circuit 35, and, if m=N, the sequence proceeds to a step S32. On the other hand, if m≠N, the sequence proceeds to a step S33 in which the ordering circuit 33 determines the sequential order of the original data, and the binarization determination circuit 44 determines the final binary data in steps S34 to S36.

More specifically, if the black pixel number m stored in the memory 43 is smaller than the black pixel number N supplied from the black pixel number counting circuit 35, the step S35 converts (N−m) white pixels of highest densities, in the descending order in the block, into black pixels.

On the other hand, if m is larger than N, the step S36 converts (m−N) black pixels of the lowest densities, in the ascending order in the block, into white pixels.

These processes are repeated for all the blocks.

The present embodiment corrects the binary data obtained in the error dispersion method by increasing or decreasing the number of black pixels according to the density in the block, and is therefore capable of reducing the stripe patterns encountered in the simple error dispersion method. Also, the image in each block can be faithfully reproduced as the number of black pixels determined from the density in said block is used as a reference.

In the following there will be explained a fourth embodiment, in which the image process unit 2 is modified.

Figure 9:
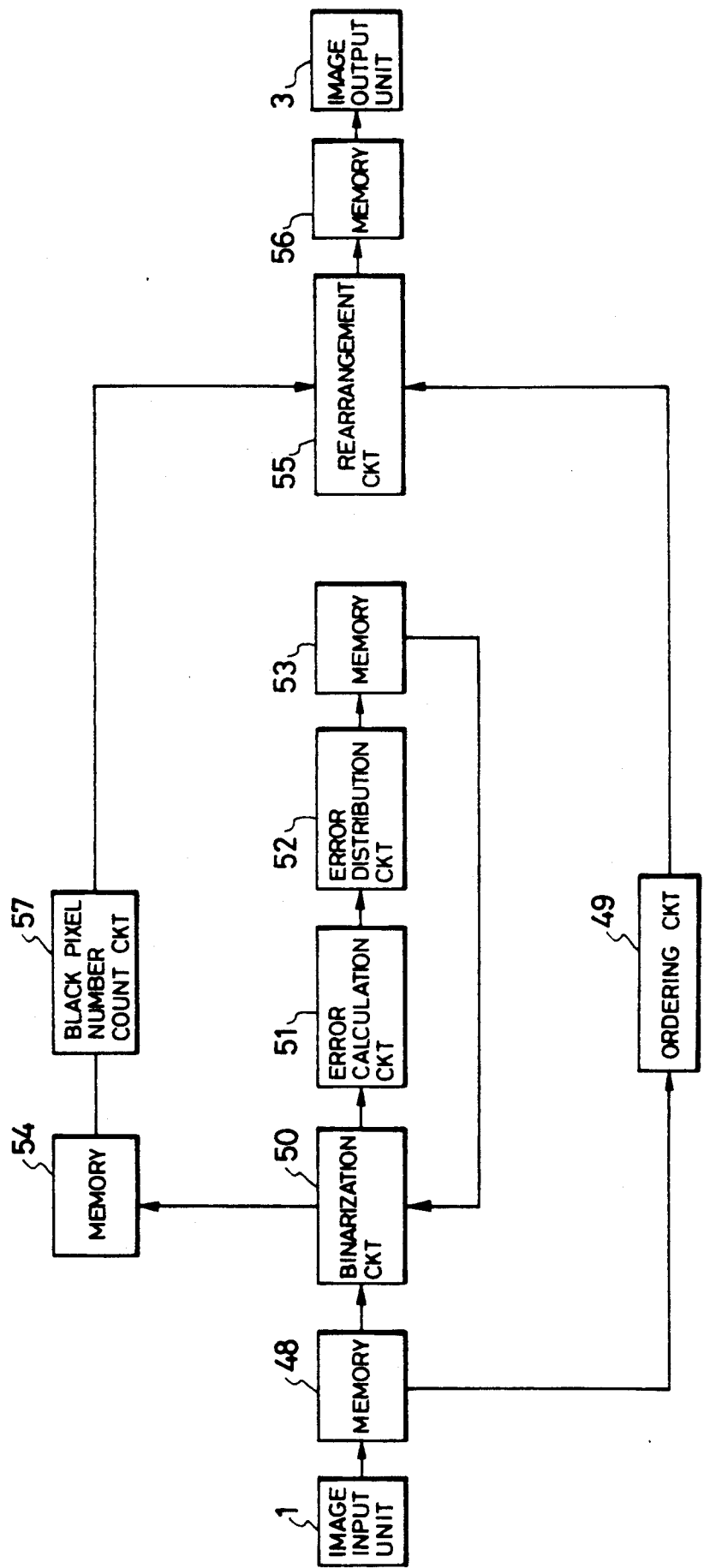
FIG. 9 is a block diagram of a fourth embodiment of the present invention.

FIG. 9 is a block diagram of the fourth embodiment of the present invention, which is provided with an image input unit 1; a memory 48 connected to said image input unit 1 and used for storing image data; an ordering circuit 49 connected to said memory 48 and used for determining the sequential order of the data in a block; a binarization circuit 50 connected to memories 48, 54 and used for binarization for each pixel with a threshold value $\alpha$; an error calculation circuit 51 connected to said binarization circuit 50 and used for calculating the error in the data between before and after binarization; an error distribution circuit 52 connected to the error calculation circuit 52 and used for determining the destinations and amounts of error distribution; a memory 53 connected to said error distribution circuit and used for storing said destinations and amounts of error distribution; a memory 54 connected to the binarization circuit 50 and used for storing binary data; a black pixel counting circuit 57 connected to the memory 54 and used for counting the number of black pixels in the binary data; a rearrangement circuit 55 connected to the ordering circuit 49 and the black pixel counting circuit 57 and used for rearranging the binary data according to the sequential order thereof; a memory 56 connected to the rearrangement circuit 55 and used for storing the final binary data; and an image output unit 3 connected to the memory 56 and used for releasing the binary data.

FIG. 11 shows an example of a block composed of 4×4 blocks, and FIG. 12 shows density data in said block.

Figure 10:
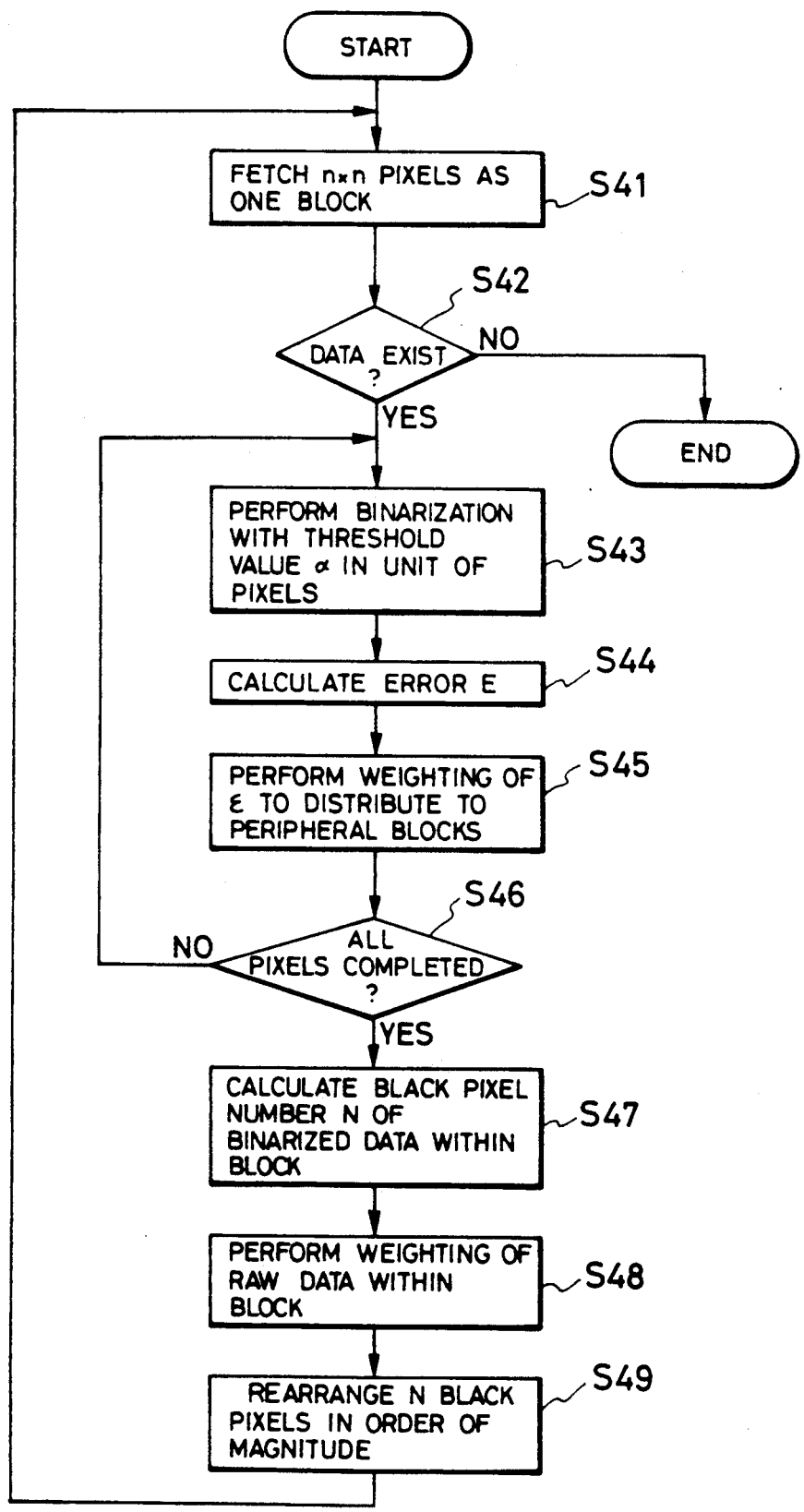
FIG. 10 is a flow chart showing the function of the embodiment shown in FIG. 9.

Now reference is made to a flow chart in FIG. 10 for explaining the function of the various units of the present embodiment.

A step S41 fetches n x n pixels (4×4 pixels in this case) as a block as shown in FIG. 11 into the memory 48, and the following process is executed for each block:

(I) Steps S43 to S46 are repeated to binarize each pixel in the block with the predetermined threshold value $\alpha$. This process will be explained in more detail in reference to FIG. 12:

(a) At first the binarization circuit 50 binarizes $D_{11}$ with the threshold value $\alpha$, by selecting $D_{11}=D_{max}$ if $D_{11} \geq \alpha$, or $D_{11}=0$ if $D_{11}<\alpha$, wherein $D_{max}$ is the highest reproduceable density, and is equal to 255 if the input data are of 8 bits.

(b) Then the error calculation circuit 51 determines the error $E_{11}$ in the binarization of $D_{11}$ either by $E_{11}=D_{11}-D_{max}$ if $D_{11} \geq \alpha$, or by $E_{11}=D_{11}$ if $D_{11}<\alpha$.

(c) The error distribution circuit 52 distributes the error $E_{11}$, generated in the binarization of $D_{11}$, among $D_{12}$, $D_{21}$ and $D_{22}$ with suitable weighting.

(d) In the binarization of $D_{12}$, the sum of said $D_{12}$ and the weighted portion of $E_{11}$ is binarized with the threshold value $\alpha$. Then an error $E_{12}$ is calculated in the same manner as in (b), and is distributed amount $D_{13}$, $D_{21}$, $D_{22}$ and $D_{23}$ with suitable weighting.

Thus, in the binarization of $D_{33}$, the sum of $D_{33}$ and the weighted portions of $E_{22}$, $E_{23}$, $E_{24}$ and $E_{32}$ is binarized with the threshold value $\alpha$, and the error $E_{33}$ is calculated in the same manner as in (b) and is distributed in the peripheral pixels.

The binarization in a block is thus completed.

(II) When the binarization is completed on all the pixels in the block, the sequence proceeds to a step S47 in which the black pixel counting circuit 57 counts the number N of pixels which have assumed the value $D_{max}$ in the block.

(III) In a step S48, the ordering circuit 49 determines the sequential ranks of the original data of the block in descending order of density. Pixels of the same density are given ranks in predetermined sequential order.

(IV) A step S49 converts the densities of N pixels, in descending order determined in (III), to $D_{max}$, and those of remaining pixels to zero.

The foregoing sequence of steps S41 to S49 is repeated for all the data, and the sequence is terminated at the step S42 when all the data are processed.

The determination of ranking and conversion in (III) and (IV) are conducted in the descending order of density, but they may also be conducted in the ascending order of density if white pixels are taken as the reference.

As explained in the foregoing, this embodiment is to binarize each pixel in a block according to the error dispersing method, and to rearrange the black pixels after binarization according to the sequential order of density of the original data. It is therefore made possible to prevent formation of stripe patterns specific to the conventional error dispersing method.

Also it is made possible to employ a simpler structure, in comparison with the aforementioned third embodiment in which the number of black pixels is determined from the total sum of the density data in the block.

Figure 13:
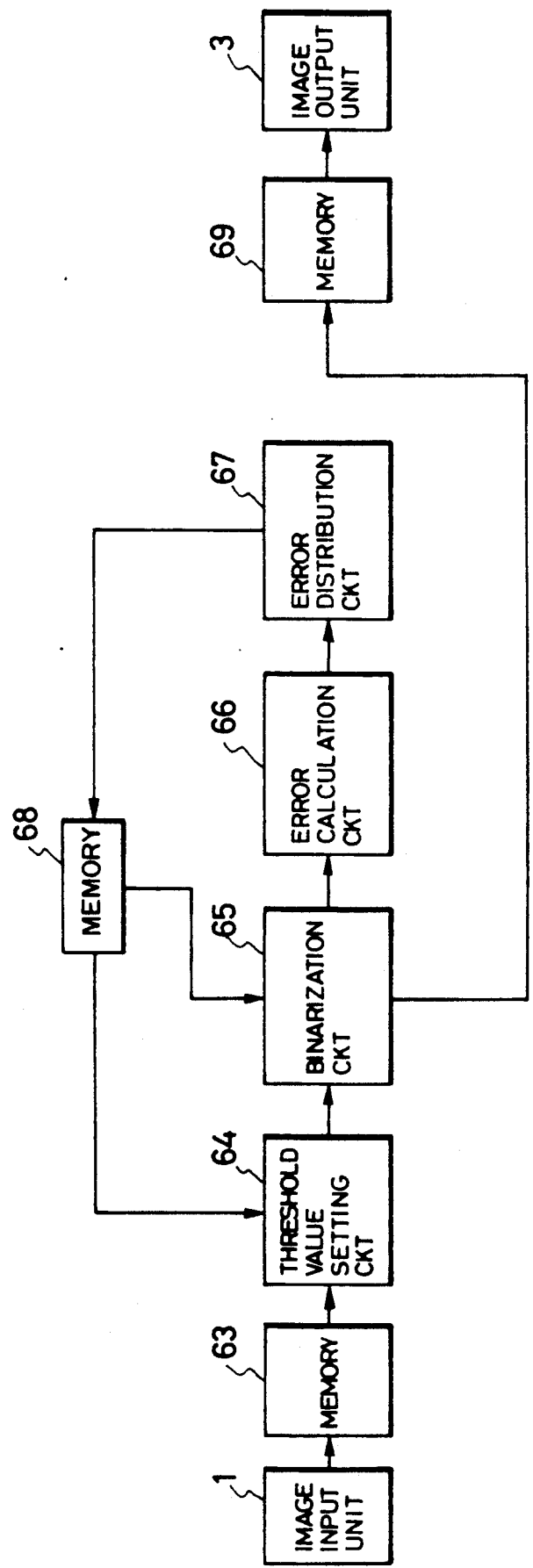
FIG. 13 is a block diagram showing still another embodiment of the image processing apparatus of the present invention.

FIG. 13 is a block diagram of still another embodiment, in which provided are an image input unit 1; a memory 63 connected to said image input unit 1 and used for storing image data of each block; a threshold value setting circuit 64 connected to memories 63, 68 and used for determining a threshold value based on the original image data and the error data; a binarizing circuit 65 connected to said threshold value setting circuit 64 and a memory 68 and used for binarizing the original image data; an error calculating circuit 66 connected to said binarizing circuit 65 and used for calculating the error between the original data and the binarized data; an error distribution circuit 67 connected to said error calculation circuit 66 and used for determining the destinations and amounts of error distribution; a memory 68 for storing the destinations and amounts of error distribution; a memory 69 connected to the binarizing circuit 65 and used for storing binarized data; and an image output unit 3 connected to the memory 69 and used for releasing the binarized data.

This embodiment is different from the foregoing embodiment shown in FIG. 9 in that the ordering circuit 49 and the redistribution circuit 55 are replaced by the threshold value setting circuit 64.

As the functions of the binarizing circuit 65, error calculation circuit 66 and error distribution circuit 67 are the same as explained before, there will be explained the function of the threshold value setting circuit 64 in the following.

FIG. 14A indicates an error $E_{ij}$ distributed to a pixel (i, j) in a block, and FIG. 14B shows the density $D_{ij}$ of the original data of said pixel (i, j).

The threshold value u may be varied, for example, by one of following methods:

(1) The range from "0" to $D_{max}$ is equally divided into three portions $0-D_L$, $D_L-D_M$ and $D_M-D_{max}$. A discrimination is made whether $D_{ij}$ falls in the range $D_L-D_M$, and, if it falls in said range, a new threshold value $\alpha'$ is determined by adding $E_{ij}/A$ to a fixed threshold value $\alpha$.

(2) A new threshold value $\alpha'$ is determined by adding $E_{ij}$, multiplied by a suitable constant, to $\alpha$.

There are also other methods of varying the threshold value.

In the present embodiment the threshold value is increased according to the error data.

More specifically, the threshold value is increased in intermediate density areas where the stripe patterns are usually generated in the error dispersing method, thereby suppressing formation of dots and preventing formation of said stripe patterns. Also, digitizing in units of blocks enables faithful reproduction of the original image and edge enhancement effect as explained before.

In addition, the density of the reproduced image can be matched with that of the original image, since the density constituting the remainder in each block is distributed among peripheral blocks.

Furthermore, in comparison with the conventional error dispersing method in which the error generated in binarization of each pixel is distributed among surrounding pixels, the processing in units of blocks allows on to prevent formation of stripe patterns encountered in conventional error dispersing methods.

Although the foregoing embodiments have been limited to binarization of data, the present invention is also applicable to multi-level digitization of data.

Also, in the foregoing embodiments, the density is detected by the number of black pixels, but it can also be based on the number of white pixels. Also, in case of a color image, there can be considered the density of a particular color.

The present invention is not limited by the foregoing embodiments but is subjected to various modifications within the scope and spirit of the appended claims.

We claim:

1. An image processing apparatus comprising:
   first calculation means for calculating a sum of density data of plural pixels existing in a first area composed of plural pixels;
   second calculation means for calculation, from the sum of density data, a number of black pixels to be arranged in the first area and a difference between the sum of density data and a sum of densities of the black pixels;
   conversion means for converting density data of all pixels existing in the first area into binary data, based on the number of black pixels obtained by said second calculation means;
   process means for dispersing data corresponding to said difference obtained by said second calculation means into a second area which is composed of plural pixels and adjacent to the first area; and
   control means for controlling said first calculation means, said second calculation means and said conversion means such that the conversion of the density data into the binary data by said conversion means is executed for each area.

2. An image processing apparatus according to claim 1, wherein said second calculation means obtains the number of black pixels by dividing a predetermined density level into said sum obtained by said first calculation means, and obtains a remainder in the division as said difference.

3. An image processing apparatus according to claim 1, wherein said predetermined density level is the density level of an output black pixel.

4. An image processing apparatus according to claim 2, further comprising means for ranking the density data of the plural pixels existing in the first area in descending order of density, wherein said conversion means is adapted to place said back pixels in pixel positions of highest densities in descending order.

5. An image processing apparatus according to claim 2, further comprising means for comparing first error data, generated in the binarization performed by said conversion means, with a predetermined value, wherein, if said error data is larger than said predetermined value, said number of black pixels is increased by one, and said process means is adapted to disperse new error data, obtained by subtracting said predetermined density level from the first error data, into adjacent areas respectively composed of plural pixels.

6. An image processing apparatus comprising:
determination means for determining, by dividing a predetermined density level into a sum of density data of plural pixels existing in a predetermined first area, a number of black pixels to be arranged in said predetermined first area;
ranking means for ranking said plural pixels in a density order, on the basis of said density data;
binarization means for binarizing the density data of all pixels existing in said predetermined first area, according to said number of black pixels and a rank obtained by said ranking means;
correction means for correcting an error generated in the binarization for all pixels in said predetermined first area by said binarization means; and
control means for controlling said determination means, said ranking means and said binarization means such that, after the binarization of all pixels in said predetermined first area is completed, the binarization of all pixels in a next area which does not overlap said predetermined first area is executed.

7. An image processing apparatus according to claim 6, wherein said predetermined density level is the density level of an output black pixel.

8. An image processing apparatus according to claim 6, wherein said error correcting means is adapted to disperse the error data, which is the remainder in the division of the total sum of the density data with said predetermined density level by said determining means, into areas adjacent to the first area.

9. An image processing apparatus according to claim 8, further comprising means for comparing said error data with a predetermined value and for increasing the number of black pixels, determined by said determining means, by one if said error data is larger than said predetermined value, wherein said correcting means is adapted, in such case, to disperse new error data, obtained by subtracting said predetermined density level from the above-mentioned error data, into areas adjacent to said first area.

10. An image processing apparatus comprising:
input means for inputting image data of plural pixels existing in a predetermined area; and
binarization means for binarizing said input image data of plural pixels into binary data corresponding to black and white by using a predetermined threshold value, pixel by pixel,
wherein said binarization means further comprises,
correction means for correcting an error generated between said input image data and said binary data, and
process means for performing, in said predetermined area, a rearranging process on said binary data of plural pixels binarized by said binarization means.

11. An image processing apparatus according to claim 10, wherein said process means further comprises count means for counting a number of black pixels of said binary data binarized by said binarization means and ranking means for ranking said image data in said predetermined area in order of density, and wherein said process means performs the rearranging process by arranging said counted black pixels in said predetermined area according to the density order.

* * * * *

UNITED STATES PATENT AND TRADEMARK OFFICE
CERTIFICATE OF CORRECTION

PATENT NO. : 5,008,950

DATED : April 16, 1991

INVENTOR(S) : AKIHIRO KATAYAMA, ET AL.

It is certified that error appears in the above-identified patent and that said Letters Patent is hereby corrected as shown below:

IN [57] ABSTRACT

Line 3, "into" should read --in--.
Line 4, "in" should read --into--.

COLUMN 1

Line 40, "phenomenon (b)" should read --phenomenon (B)--.
Line 61, "noise" should read --noise,--.

COLUMN 2

Line 30, "t" should read --to--.
Line 32, "objects" should read --objects,--.

COLUMN 4

Line 17, "N=[S/Qj" should read --N=[S/Q]--.
Line 19, "E=S-N X Q (2)" should read --E=S-N X Q (2)--.
Line 21, "☐" should read --[  ]--.
Line 47, "steps 1 to 5" should read --steps S1 to S5--.

COLUMN 5

Line 13, "circuit 10" should read --circuit 20--.
Line 14, "16;" should read --26;--.
Line 42, "N=[S/Qj]" should read --N=[S/Q]--.
Line 46, "☐" should read --[  ]--.

UNITED STATES PATENT AND TRADEMARK OFFICE
CERTIFICATE OF CORRECTION

PATENT NO. : 5,008,950
DATED : April 16, 1991
INVENTOR(S) : AKIHIRO KATAYAMA, ET AL.

It is certified that error appears in the above-identified patent and that said Letters Patent is hereby corrected as shown below:

COLUMN 6

Line 37, "memories 32, 28" should read --memories 32, 38--.

COLUMN 7

Line 8, "value c" should read --value $\alpha$--.
Line 35, "increases" should read --increase--.

COLUMN 8

Line 11, "circuit 52" should read --circuit 51--.
Line 45, "reproduceable" should read --reproducible--.
Line 56, "amount" should read --among--.

COLUMN 9

Line 59, "value u" should read --value $\alpha$--.

COLUMN 10

Line 3, "embodiment" should read --embodiment,--.
Line 20, "on" should read --one--.
Line 31, "subjected" should read --subject--.
Line 38, "calculation," should read --calculating,--.
Line 63, "1," should read --2,--.

UNITED STATES PATENT AND TRADEMARK OFFICE
CERTIFICATE OF CORRECTION

PATENT NO. : 5,008,950

DATED : April 16, 1991

INVENTOR(S) : AKIHIRO KATAYAMA, ET AL.

Page 3 of 3

It is certified that error appears in the above-identified patent and that said Letters Patent is hereby corrected as shown below:

COLUMN 12

Line 22, "comprises," should read --comprises:--.

Signed and Sealed this

Eighth Day of October, 1991

Attest:

HARRY F. MANBECK, JR.

Attesting Officer

Commissioner of Patents and Trademarks